(12) United States Patent
Coughlan et al.

(10) Patent No.: US 8,027,460 B1
(45) Date of Patent: Sep. 27, 2011

(54) AUTOMATIC PROVISIONING OF DISTINCT RING-TONES FOR CO-LOCATED TELEPHONES

(75) Inventors: Marc William Joseph Coughlan, Rozelle (AU); Alexander Quentin Forbes, Westleigh (AU); Ciaran Gannon, Killara (AU); Peter Donald Runcie, Bilgola Plateau (AU); Alexander Martin Scholte, Phegans Bay (AU)

(73) Assignee: Avaya Inc., Basking Ridge, NJ (US)

( * ) Notice: Subject to any disclaimer, the term of this patent is extended or adjusted under 35 U.S.C. 154(b) by 1218 days.

(21) Appl. No.: 11/728,852

(22) Filed: Mar. 27, 2007

(51) Int. Cl.
*H04M 1/00* (2006.01)

(52) U.S. Cl. .............. 379/372; 379/373.01; 379/373.02; 379/373.03; 379/373.04; 379/373.05

(58) Field of Classification Search ............ 379/373.01, 379/88.17, 88.19; 415/412.2; 705/57
See application file for complete search history.

(56) References Cited

U.S. PATENT DOCUMENTS

| | | | |
|---|---|---|---|
| 7,586,031 B1* | 9/2009 | Baker | 84/609 |
| 2004/0032946 A1* | 2/2004 | Koser et al. | 379/373.01 |
| 2004/0066920 A1* | 4/2004 | Vandermeijden | 379/88.19 |
| 2005/0175161 A1* | 8/2005 | Reynolds et al. | 379/88.17 |
| 2006/0259434 A1* | 11/2006 | Vilcauskas et al. | 705/57 |
| 2007/0161412 A1* | 7/2007 | Nevid et al. | 455/567 |
| 2008/0280596 A1* | 11/2008 | Moody et al. | 455/412.2 |

OTHER PUBLICATIONS

Chirp, http://en.wikipedia.orq/wiki/Chirp, (ND), pp. 1-3.
Walter Klotz, "Graph Coloring Algorithms", http://www.math.tu-clausthal.de/Arbeitsgruppen/Diskrete-Optimierung/publications/2002/gca.ps, (ND), pp. 1-9.

* cited by examiner

*Primary Examiner* — Curtis Kuntz
*Assistant Examiner* — Joseph J Nguyen

(57) ABSTRACT

A controller ensures that ring-tones of a relatively-small pool of distinct ring-tones are individually assigned to telephones of a group of telephones in such a way as to maximize the physical separation of telephones with the same or similar ring-tones. One telephone after another generates an audio signal, such as a chirp or a ring-tone, while the other telephones listen for the audio signal and report results of their listening to the controller. The controller uses the results to assign ring-tones to the telephones. A graph-coloring algorithm may be used to make the assignments.

18 Claims, 4 Drawing Sheets

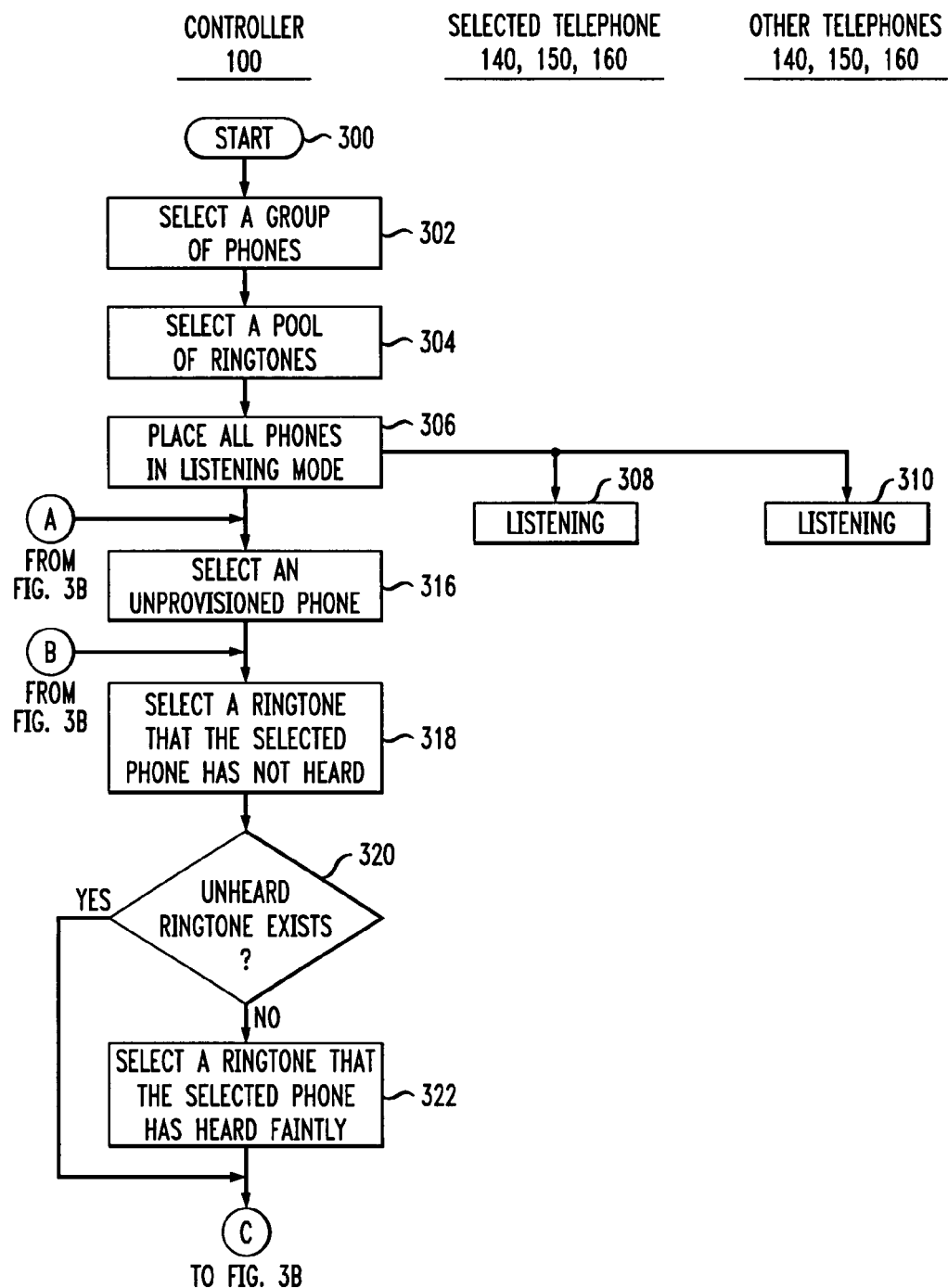

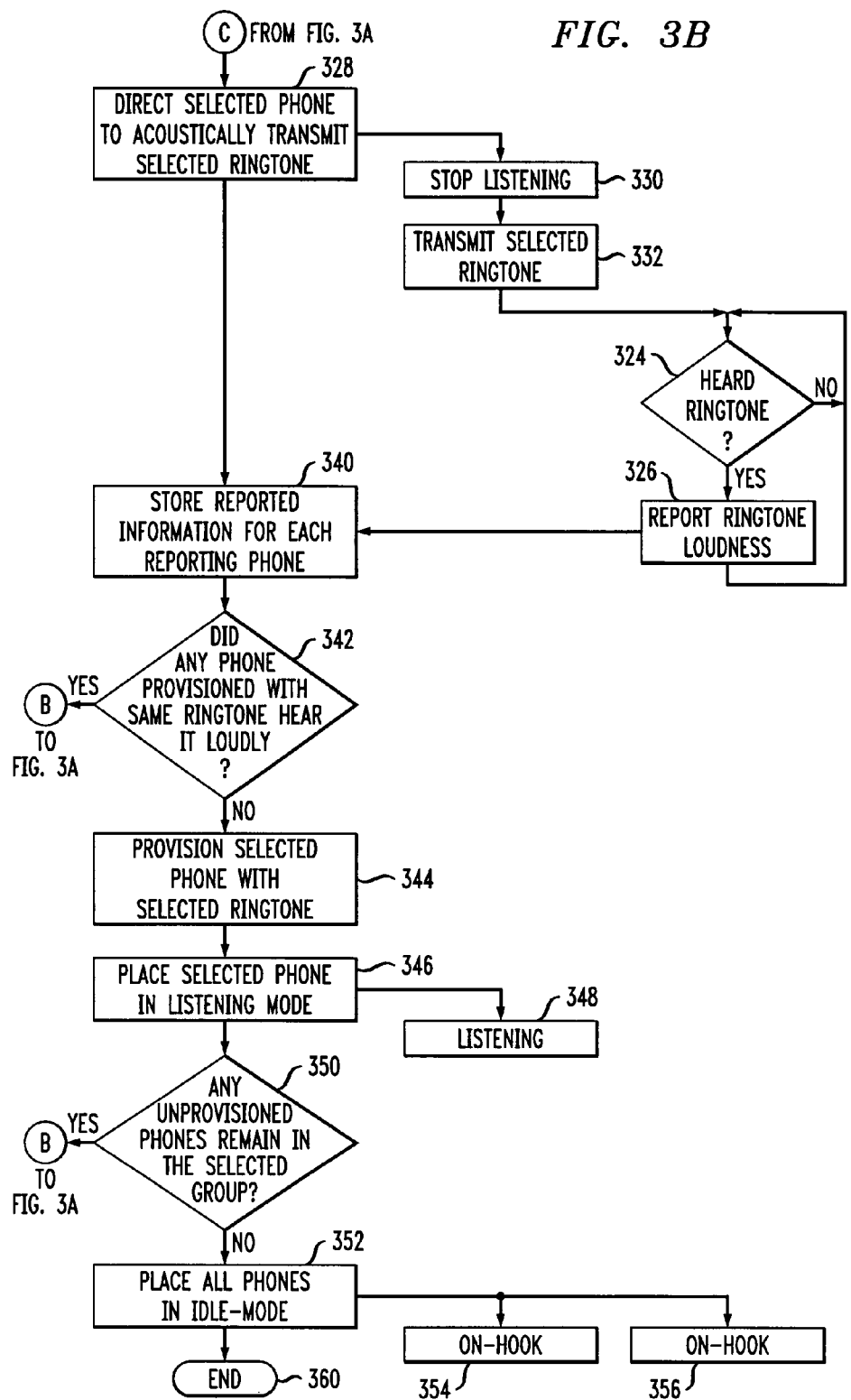

AUTOMATIC PROVISIONING OF DISTINCT RING-TONES FOR CO-LOCATED TELEPHONES

TECHNICAL FIELD

This invention relates generally to telephony and specifically to administration and provisioning of telephones.

BACKGROUND OF THE INVENTION

Many modern telephones have the capability of generating any selected one of a plurality of different ring tones. An example is the Avaya 4620 phone of Avaya Inc., which provides eight possible ring tones. Also, many cell phones support user-defined or downloaded ring tones, including music files. When telephones are being installed in an office, each telephone is assigned a default ring tone. For example, a script exists for the Asterisk open-source private-branch exchange (PBX) system that assigns ring tones to individual extension numbers or Internet protocol (IP) addresses.

The problem is that the phones in one area—that is, telephones that are physically perceived to be fairly close to each other—may be configured to generate the same default ring tone, and thus it can be very difficult to distinguish one ringing phone from another. The default ring-tone of a telephone can subsequently be changed to a different ring tone by a user of that telephone. Nevertheless, ensuring that ring tones of a large number of phones are sufficiently different from each other to be readily distinguishable is a challenge. Software such as the Heresy AI Composer from Wild Palm generates unique ring tones for cell phones, and claims to be theoretically capable of generating billions of compositions. Nevertheless, generating a unique ring tone for each phone is not necessarily a good solution, because it is difficult to ensure that, as the number of ring tones increases, the ring tones actually sound different from each other.

SUMMARY OF THE INVENTION

This invention is directed to solving these and other problems and disadvantages of the prior art. Illustratively, the invention uses a relatively-small pool of distinct ring-tones and automatically ensures that the ring-tones are assigned to phones in such a way as to maximize the physical separation of phones with the same or similar ring-tones. A group of phones that are to be provisioned with ring-tones is specified. A telephone or phone as used herein refers to any instrument that generates alarming signals, while a ring-tone as used herein refers to any alarming audio signal.

According to one illustrative embodiment of the invention, each phone in turn generates an audio-signal (for example, a chirp) while all of the other phones in the group listen for the audio signal. A determination is made of which of the phones heard which of the phones' audio signal and the results are used to automatically assign ring-tones to the telephones of the group. Different ring-tones are assigned to phones that heard each other's audio signals, or at least heard them loudly. Conversely, the same ring-tone may be assigned to at least some of the phones that did not hear each other's audio signals, or at least did not hear them loudly. Illustratively, a graph-coloring algorithm may be used to assign ring-tones to phones, where the different colors in the algorithm represent different ring-tones. According to another illustrative embodiment of the invention, each phone in turn generates a ring-tone that is selected for and assigned to that phone, while all of the other phones of the group listen for the ring-tone. The ring-tone that is selected for and assigned to a phone is one of the available ring-tones which that phone has not heard loudly from the other phones.

Furthermore, after provisioning and when not in use, phones may continue to listen for ring-tones, and if a phone hears the same or a similar ring-tone to its own, it prompts the user to change to a different ring-tone.

The main advantage is that a limited pool of distinct ring-tones can be automatically and optimally assigned to co-located phones without an administrator needing to know where the phones are located relative to each other or having to take into account the acoustic environment. The result is that users are better able to tell whose phone is ringing. This can be especially important in open-seating and cubicle office environments.

While the invention has been characterized above in terms of a method, it also includes any apparatus for performing the method, and any computer-readable medium containing instructions which, when executed by a computer, cause the computer to perform the method.

BRIEF DESCRIPTION OF THE DRAWING

These and other advantages and features of the invention will become more apparent from the following description of an illustrative embodiment of the invention considered together with the drawing, in which:

FIGS. 3A and 3B are a functional flow diagram of a second embodiment of a ring-tone provisioning process of the system of FIG. 1.

DETAILED DESCRIPTION

Figure 1:
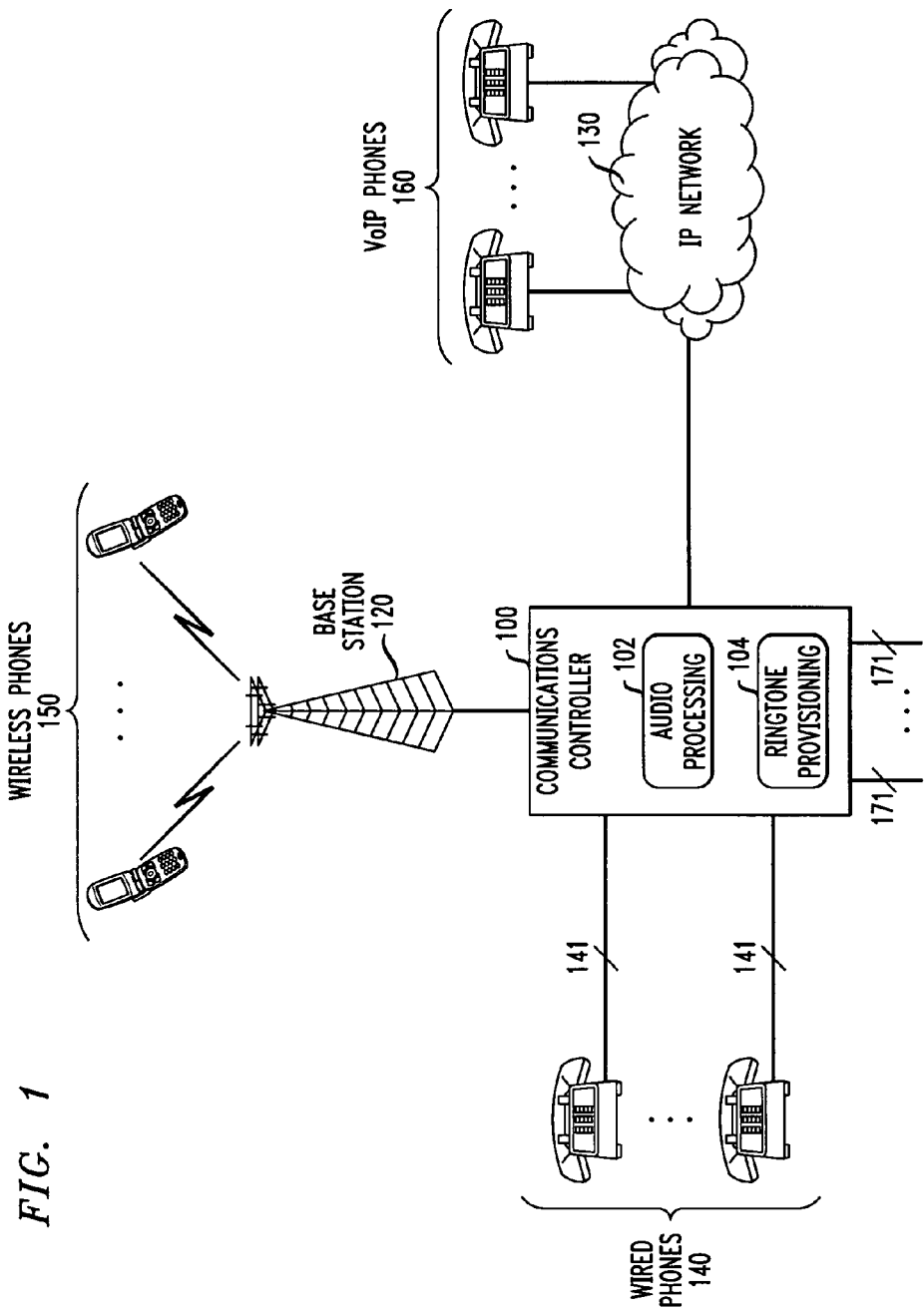
FIG. 1 is a block diagram of a telephone system that includes an illustrative embodiment of the invention.

FIG. 1 shows an illustrative telephone system that comprises a communications controller 100 serving a plurality of telephones 110, 150, 160. Communications controller 100 may be, for example, the Communications Manager system of Avaya Inc. The telephones illustratively comprise one or more of wired telephones 140 (preferably digital phones) that are connected to controller 100 via telephone lines 141, wireless telephones 150 that are wirelessly connected to controller 100 by a base station 120, and Voice over Internet Protocol (VoIP) phones 160 that are connected to controller 100 via an Internet Protocol (IP) network 130. Telephone trunks 171 connect the telephone system of FIG. 1 to other telephone systems. As described so far, the system of FIG. 1 is conventional.

In an embodiment of the invention, communications controller 100 includes audio-processing equipment and/or functionality 102 and ring-tone provisioning equipment and/or functionality 104 for automatically provisioning telephones with ring-tones. "Automatically" is used herein to mean without human action. Controller 100 is illustratively a stored-program-controlled machine that comprises a processor for executing programs and a memory or any other store for storing programs and data for the processor. Audio-processing 102 is illustratively implemented in a digital signal processor (DSP) or in a program executing on controller 100. Ring-tone provisioning 104 is illustratively implemented as a program executing on controller 100. The locus of execution may be either an adjunct processor of controller 100, or it may be the main processor of controller 100 itself. In an alternative embodiment of the invention, audio-processing 102 and at least portions of ring-tone provisioning may be distributed among telephones 140, 150, 160. It is common for modern telephones 140, 150, 160 and controllers 100 to include processors for executing, and memories for storing, programs. Such programs may include audio-processing 102 and ring-tone provisioning 104. The location and form of elements 102 and 104 is substantially unimportant to the invention.

Figure 2:
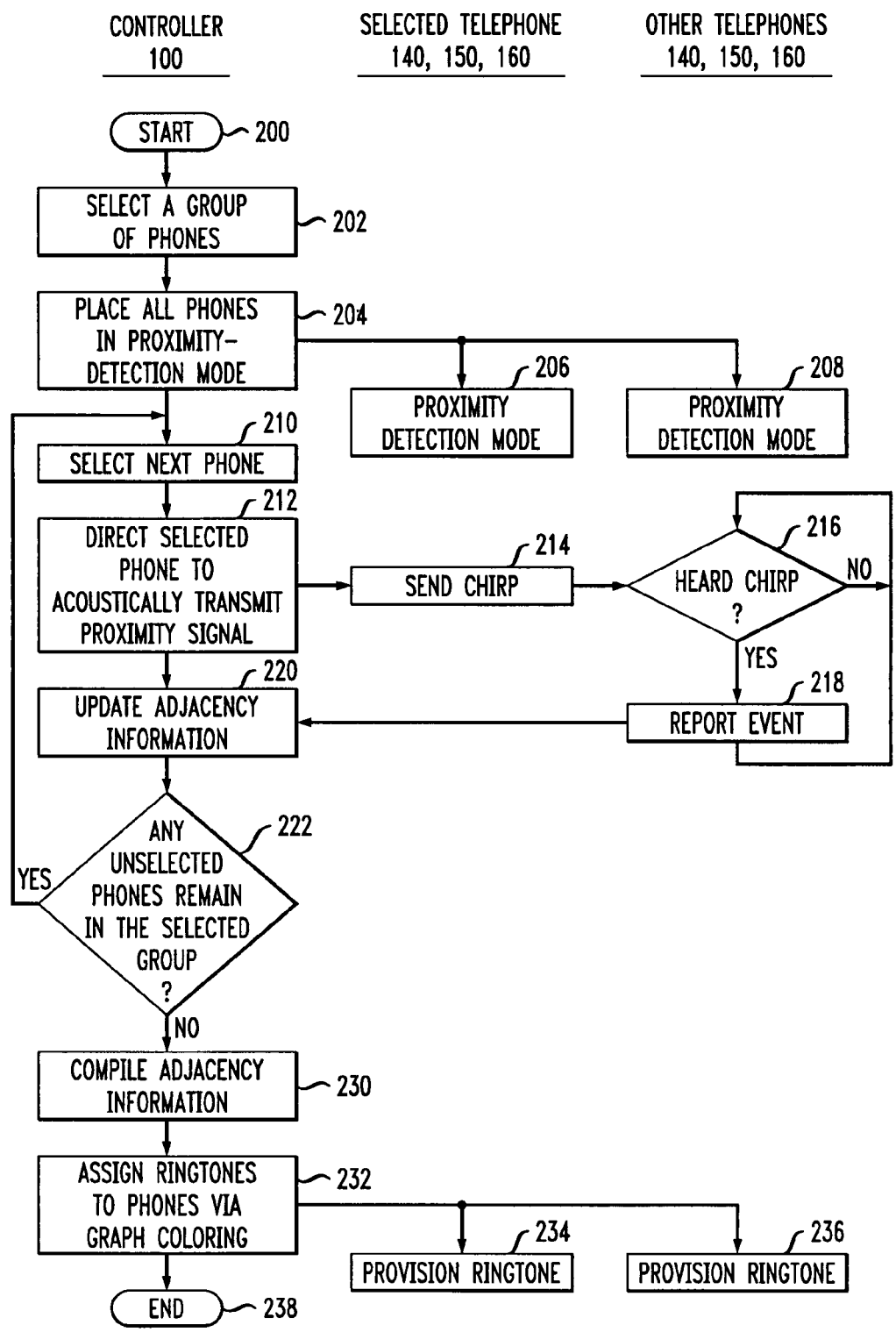
FIG. 2 is a functional flow diagram of a first embodiment of a ring-tone provisioning process of the system of FIG. 1.

FIG. 2 is a functional flow diagram of a first illustrative example of a ring-tone provisioning process engaged in by a selected group of phones 140, 150, 160 and controller 100. Controller 100 coordinates this process. In this illustrative example, selected phones 140, 150, 160 must be able to generate, transmit acoustically, detect, and report detection of, a "proximity" signal, such as a chirp. A chirp is a special signal that is commonly used in sonar and radar applications. It can be detected using correlation at the receiver, and it helps to mitigate effects of distortion by the transmission medium. An illustrative description of chirp characteristics can be found at http://en.wikipedia.org/wiki/chirp. The requirement to generate a chirp generally precludes the use of this example of the proximity-detection process with analog phones.

Upon the ring-tone provisioning process being started, at step 200 of FIG. 2, controller 100 first directs telephones to perform proximity-detection among themselves. Controller 100 selects a group of phones 140, 150, 160 that will engage in proximity detection, at step 202. The selected group of phones typically comprises the phones at a particular location, such as an office of cubicles, where the selected phones are in substantial proximity to each other. If they are portable phones, wireless phones 150 are preferably kept stationary for the duration of the process, each at the place of its most-usual location and use. The selected group of phones may be all phones 140, 150, 160, or a subset thereof. The selected group is usually specified to controller 100 by a system administrator. To continue the proximity-detection process, phones of the selected group must be idle, that is, not in use, "on-hook." Controller 100 then places all phones in the selected group in proximity-detection mode, at step 204, illustratively by sending a message to each phone in the group commanding it to place itself in the proximity-detection mode, at step 204. The phones of the selected group respond by assuming the proximity-detection mode, at steps 206 and 208.

Controller 100 then selects a previously-unselected one of the phones in the selected group, at step 210, and directs the selected phone to acoustically transmit a proximity signal, e.g., to transmit a chirp, at step 212. The selected phone responds by generating and acoustically transmitting the chirp, at step 214.

Meanwhile the other phones of the selected group are in the proximity-detection mode where they are listening for the chirp, at step 216. If a phone does not hear the chirp, as determined at step 216, it merely continues listening. After a preset period of time it may report that it did not hear a chirp. If a phone does hear the chirp, as determined at step 216 via audio-processing resources in the phone, it reports this event to controller 100, a step 218. The report is typically a message that identifies the reporting phone and contains information such as the audio intensity of the detected chirp, the quality of the detection (e.g., the strength of correlation between a prototype chirp (the transmitted chirp) and the detected chirp, the loudness of the detected chirp, etc. Alternatively, if a phone does not include audio-processing resources, it may report the actual received chirp to controller 100 at step 218, and leave it up to audio-processing resources 102 of controller 100 to analyze the received chirp.

In any event, controller 100 uses the received information to update adjacency information that it maintains for the selected group of phones, at step 220. Controller 100 then checks whether any phones remain in the selected group which the controller has not selected at step 210, at step 222. If so, controller 100 returns to step 210 to select another unselected phone; if so, controller 100 proceeds to step 230.

At step 230, controller 100 compiles the adjacency information that it gathered at step 220 into a form useable for determining which ring-tone to assign to which phone. The assignment illustratively can be effected by a graph-coloring algorithm, and so controller 100 compiles the adjacency information into a form useable by the graph-coloring algorithm. Graph coloring in computer science describes a set of algorithms that try to assign a unique color to nodes that are adjacent in an adjacency graph or matrix. A number of such algorithms is well known. An illustrative description of graph coloring may be found at http://www.math.tu-clausthal.de/Arbeitsgruppen/Diskrete-Optimierung/publications/2002/gca.ps. Controller 100 then applies the graph-coloring algorithm to the gathered information to determine which ring-tones to assign to which phones of the selected group, and provisions the phones accordingly, at step 232. The different "colors" applied to nodes by the graph-coloring algorithm correspond to the different ring-tones applied to phones of the selected group by controller 100. Each phone of the selected group responds by becoming provisioned with the ring-tone that was selected for it by controller 100, at step 234 and 236. The ring-tone provisioning process then ends, at step 238.

FIGS. 3A and 3B together form a functional flow diagram of a second illustrative example of the ring-tone provisioning process engaged in by controller 100 and selected phones 140, 150, 160. In this illustrative example, the phones perform proximity detection by acoustically transmitting and listening for actual ring-tones, as opposed to a chirp. This version of the process is likely to require more processing overhead than the version of FIG. 2.

Upon the ring-tone provisioning process being started, at step 300 of FIG. 3A, controller 100 again selects a group of phones that will engage in proximity detection, at step 302, in the manner described for step 202 of FIG. 2. Controller 100 also selects a pool of ring-tones that may be assigned to the selected group of phones, at step 302. This may be all of the ring-tones that the phones of the selected group are capable of generating, or a subset thereof selected by an administrator. For the process to continue, phones of the selected group must be idle, that is, not in use, "on-hook." Controller 100 then places all phones in the selected group in listening mode, at step 306. The phones in the selected group respond by assuming the listening mode, at steps 308 and 310. Controller 100 then selects a previously-unselected one of the phones in the selected group, at step 316, and selects for that phone a ring-tone from the selected group of ring-tones that the selected phone has not reported hearing, at step 318. If such an unheard ring-tone does not exist in the selected group, as determined at step 320, controller 100 instead selects a ring-tone from the group of ring-tones that the selected phone has reported as hearing faintly, at step 322.

Following selection of an unheard or a faintly-heard ring-tone at step 320 or 322, controller 100 directs the selected phone to acoustically transmit the selected ring-tone, i.e., to ring with the selected ring-tone, at step 328 of FIG. 3B. The selected phone responds by exiting the listening mode, at step 330, and ringing with the selected ring-tone, at step 332.

Meanwhile, the other phones of the selected group are in the listening mode where they are listening for ring-tones, at step 334. If a phone does not hear a ring-tone, as determined at step 334, it merely continues listening. If a phone does hear a ring-tone, as determined at step 334 via audio-processing resources in the phone, it reports this event to controller 100, at step 336. The report is typically a message that identifies the reporting phone and includes information such as the loudness of the heard ring-tone. Alternatively, if a phone does not include audio-processing resources, it may report the actual received sound to controller 100 at step 336, and leave it up to audio-processing resources 102 of controller 100 to analyze the received sound.

In any event, controller 100 stores the reported information for each reporting phone, at step 340. Controller 100 then checks the stored information to determine, at step 342, whether any phone of the selected group that has already been provisioned with a ring-tone has heard this ring-tone loudly. If so, controller 100 returns to step 318 of FIG. 3A to select another ring-tone for the selected phone.

If and when it determines at step 342 that no provisioned phone has heard the selected ring tone loudly, controller 100 provisions the selected phone with the selected ring-tone, at step 344, and then places the provisioned selected phone back in listening mode, at step 346. In response, the selected phone resumes listening for ring-tones, at step 348. Controller 100 then checks whether any unprovisioned phones remain in the selected group of phones, at step 350. If so, controller 100 returns to step 316 of FIG. 3A to select another unprovisioned phone; if so, controller places all phones of the selected group back in idle, on-hook, mode, at step 352. Each phone of the selected group responds by going on-hook, at steps 354 and 356. The ring-tone provisioning process then ends, at step 360.

Of course, various changes and modifications to the illustrative embodiment described above will be apparent to those skilled in the art. For example, a combination of the two described techniques can be used to improve the quality of the result. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
generating an audio signal from a telephone of a group of telephones while other telephones of the group are acoustically detecting the audio signal;
repeating the step of generating and detecting for other telephones of the group;
in a controller determining which of the group of telephones detected which of the audio signals generated by the group of telephones; and
using results of the determining to assign ring-tones to the group of telephones, including assigning different ring-tones to each telephone of a subgroup of telephones, of the group of telephones, that detected the audio signals of each other telephone of the subgroup of telephones.

2. The method of claim 1 wherein:
using further comprises
assigning a same ring-tone to at least some telephones of the group of telephones that did not detect at least one of the audio signals of the group of telephones or detected the audio signals at a magnitude below a threshold value.

3. The method of claim 1 wherein:
acoustically detecting the audio signal comprises detecting the audio signal at a magnitude above a threshold value.

4. The method of claim 3 wherein:
using further comprises
assigning a same ring-tone to at least some telephones of the group of telephones that did not acoustically detect the audio signals of the group of telephones.

5. The method of claim 1 wherein:
using comprises
performing a graph-coloring algorithm on information obtained by the determining, where different colors in the algorithm represent the different ring-tones; and
assigning the different ring-tones to the telephones according to results of the algorithm.

6. The method of claim 1 wherein:
generating comprises
generating a chirp.

7. The method of claim 1 wherein:
generating comprises
generating a sample ring-tone.

8. The method of claim 1 wherein:
the step of repeating comprises
repeating the step of generating for each telephone of the group.

9. A method comprising:
in a controller selecting one of a plurality of different ring-tones, which selected ring-tone a telephone of a group of telephones has not acoustically detected at a level above a threshold value;
the controller assigning the selected ring-tone to the telephone;
generating the one ring-tone from the telephone while other telephones of the group acoustically detect the ring-tone; and
repeating the steps of selecting, assigning, and generating for other telephones of the group.

10. The method of claim 9 wherein:
the step of repeating comprises
repeating the steps of selecting, assigning, and generating for each telephone of the group.

11. At least one non-transitory computer-readable medium containing instructions which, when executed by at least one computer, cause the at least one computer to perform the method of one of claims 1-10.

12. An apparatus comprising:
a controller for controlling a group of telephones, adapted to sequentially select each telephone from the group, to cause a presently-selected telephone of the group to generate an audio signal and simultaneously to cause other telephones of the group to acoustically detect the audio signal, to determine which of the group of telephones detected which of the audio signals generated by the group of telephones, and to use determined results to assign ring-tones to the group of telephones, including to assign different ring-tones to each telephone of a subgroup of telephones, of the group of telephones, that detected the audio signals of each other telephone of the subgroup of telephones.

13. The apparatus of claim 12 wherein
each telephone of the group is adapted to generate an audio signal when directed to do so, to acoustically detect the audio signals generated by the group of telephones, to report results of the detection to the controller, and to generate a ring-tone assigned to the telephone by the controller.

14. The apparatus of claim 12 wherein:
the controller is adapted to perform a graph-coloring algorithm on the determined results, where different colors in the algorithm represent the different ring-tones, and to assign the different ring-tones to the telephones according to results of the algorithm.

15. The apparatus of claim 12 wherein:
the controller is adapted to assign different ring-tones to each telephone of a subgroup of telephones, of the group of telephones, that detects the audio signals of the telephones of the subgroup at a magnitude above a threshold value, and to assign a same ring-tone to at least some telephones of the group that do not detect the audio signals of the group of telephones above the threshold value.

16. The apparatus of claim 12 wherein:
the audio signal comprises one of a chirp and a sample ring-tone.

17. An apparatus comprising:
a controller for controlling a group of telephones, adapted to select from the group a telephone that does not have an assigned ring-tone, to select one of a plurality of different ring-tones, which selected ring-tone the selected telephone has not detected at a magnitude above a threshold value, to assign the selected ring-tone to the selected telephone, to cause the selected telephone to generate the assigned ring-tone and simultaneously to cause other telephones of the group to acoustically detect the ring-tone, until each telephone of the group is assigned a ring-tone.

18. The apparatus of claim 17 wherein
each telephone of the group of telephones is adapted to generate the ring-tones of the plurality of ring-tones, to acoustically detect the ring-tones generated by the group of telephones, to report results of the detection to the controller, and subsequently to being assigned a ring-tone of the plurality of ring-tones by the controller to generate the assigned ring-tone.

* * * * *